(12) United States Patent
Shotton et al.

(10) Patent No.: US 7,530,176 B2
(45) Date of Patent: *May 12, 2009

(54) METHOD AND APPARATUS FOR MONITORING ELEMENT ALIGNMENT

(75) Inventors: Peter Gilbert Shotton, Bucks (GB); Ronald Peter Payne, Bucks (GB)

(73) Assignee: Cementation Foundations Skanska Limited, Hertfordshire (GB)

( * ) Notice: Subject to any disclaimer, the term of this patent is extended or adjusted under 35 U.S.C. 154(b) by 277 days.

This patent is subject to a terminal disclaimer.

(21) Appl. No.: 10/549,363

(22) PCT Filed: Mar. 8, 2004

(86) PCT No.: PCT/GB2004/000948

§ 371 (c)(1),
(2), (4) Date: Jun. 28, 2006

(87) PCT Pub. No.: WO2004/081294

PCT Pub. Date: Sep. 23, 2004

(65) Prior Publication Data

US 2006/0254068 A1 Nov. 16, 2006

(30) Foreign Application Priority Data

Mar. 14, 2003 (GB) .................................. 0305899.7

(51) Int. Cl.
*G01B 1/00* (2006.01)
(52) U.S. Cl. .............................. 33/544; 33/302; 405/239
(58) Field of Classification Search .................. 33/544, 33/302, 304, 787; 405/239
See application file for complete search history.

(56) References Cited

U.S. PATENT DOCUMENTS

| 3,077,670 | A | * | 2/1963 | Waters | ........................ 33/302 |
| 3,544,957 | A | * | 12/1970 | Smetanin et al. | ......... 340/855.3 |
| 3,693,142 | A | * | 9/1972 | Jones | ...................... 340/853.8 |
| 4,022,284 | A | * | 5/1977 | Crow | ............................ 173/2 |

(Continued)

FOREIGN PATENT DOCUMENTS

EP 0 302 707 A1 2/1988

(Continued)

OTHER PUBLICATIONS

Patents Abstracts of Japan Publication No. 60141924 Date of Publication of Application: Jul. 7, 1985.

(Continued)

*Primary Examiner*—G. Bradley Bennett
*Assistant Examiner*—Tania C Courson
(74) *Attorney, Agent, or Firm*—Browdy and Neimark, PLLC

(57) ABSTRACT

The present invention relates to a method of measuring the difference in alignment between a first plan position of an element (1) and a second plan position of an element, the method comprising the use of: i) at least one rigid or taut connection (4) extending between a first point (2) at the level of the first plan position and a second point (3) at the level of the second plan position, the first and second points being at an identical displacement from the element; and ii) one or more electrolevel gauges (5) provided on the or each rigid or taut connection, so as to measure the inclination of the rigid or taut connection.

18 Claims, 3 Drawing Sheets

U.S. PATENT DOCUMENTS

| | | | | |
|---|---|---|---|---|
| 4,130,942 | A | * | 12/1978 | Lapeyre .................. 33/312 |
| 4,434,558 | A | | 3/1984 | Face, Jr. et al. |
| 4,459,759 | A | * | 7/1984 | Hulsing, II ............... 33/304 |
| 4,625,423 | A | | 12/1986 | Sackett |
| 4,627,170 | A | | 12/1986 | McKechnie |
| 6,246,244 | B1 | | 6/2001 | Leteurtre et al. |
| 2006/0233617 | A1 | * | 10/2006 | Shotton et al. .......... 405/232 |

FOREIGN PATENT DOCUMENTS

| | | |
|---|---|---|
| GB | 2 296 569 A | 7/1996 |

OTHER PUBLICATIONS

Patent Abstracts of Japan Publication No. 09-003894 Date of Publication of Application: Jan. 7, 1997.

* cited by examiner

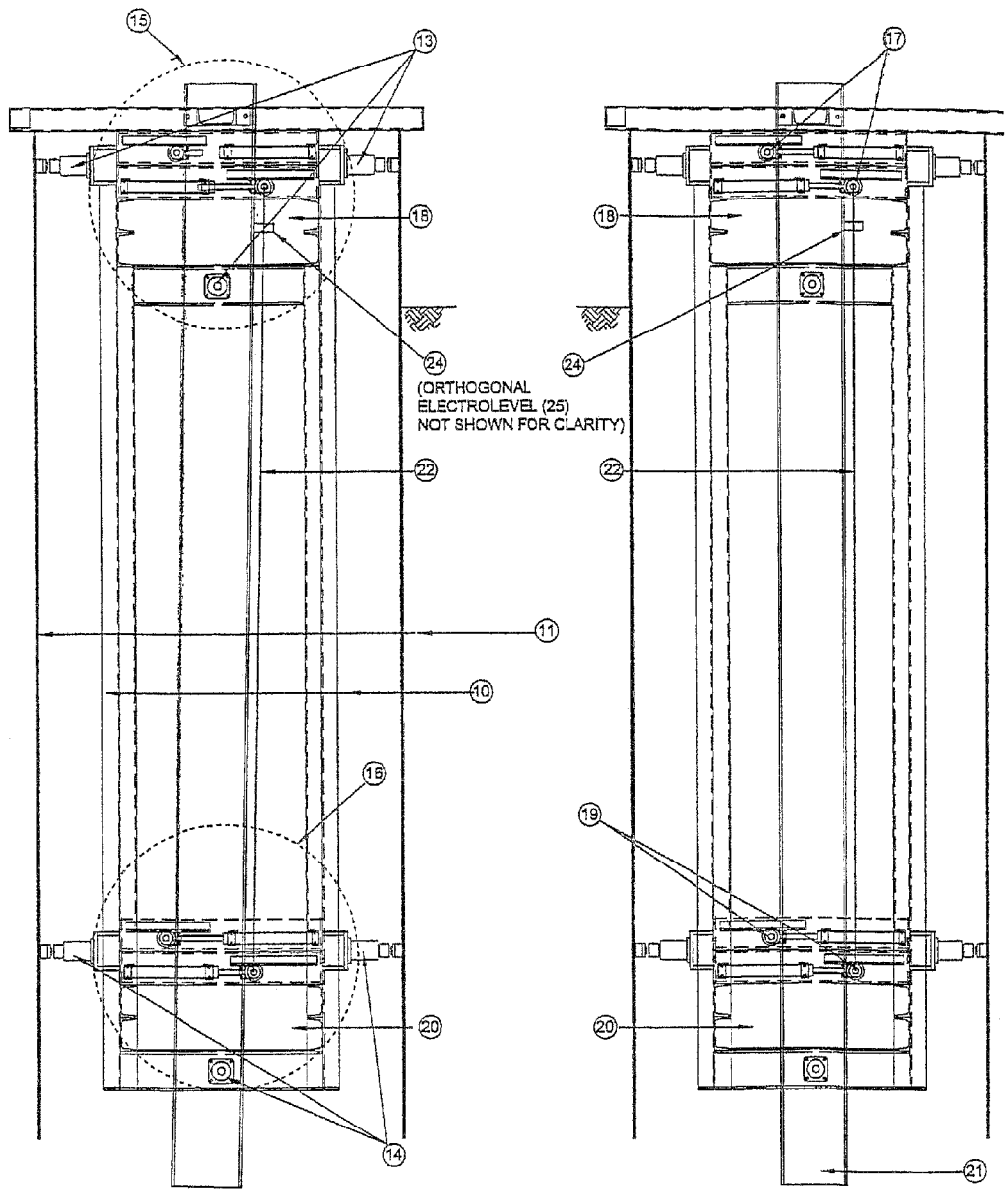

METHOD AND APPARATUS FOR MONITORING ELEMENT ALIGNMENT

BACKGROUND OF THE INVENTION

1. Technical Field of the Invention

The present invention relates to a method and apparatus for measuring the alignment of an element.

2. Prior Art

There are many instances, particularly in the construction industry, where it is necessary to determine the so-called verticality of an element. Often the elements are not 100% straight, for example steel sections are supplied to certain rolling tolerances, and may therefore be slightly bowed. Therefore, it is not strictly accurate to refer to the verticality of an element; it is more appropriate to refer to the alignment of two (or more) levels of the element. Within the trade, the use of the word "vertical" is often interpreted as meaning that the location of two plan positions (i.e. the 2-D cross-section of the element at two different levels), are in vertical alignment.

Examples of instances where there exists a requirement to measure the alignment include the following:

1) Monitoring the alignment or "verticality" of a mast during continuous flight auger (CFA) piling techniques, or of a leader (typically a longitudinal frame fitted to the jibs of crawler base machines) during driven piling operations;

2) Monitoring the alignment of stop-ends placed in diaphragm wall panels both in and out of the plane of the diaphragm wall;

3) To monitor the verticality of pile bores and diaphragm wall panels;

4) During driven techniques to monitor the installation of the tube of a cast-in-situ pile, a pre-cast pile section, a steel section or sheet pile etc;

5) To ensure that a lift ram liner or bore for lift ram is plumb;

6) In continuous flight auger (CFA) piling operations, the verticality of the auger should be measured during the setting up of the rig and also once the auger has reached the founding depth;

7) To monitor casings which may be vibrated or driven to depth.

8) During the placement of columns to structural steel tolerances, within pile bores and diaphragm wall panels.

Although in the majority of instances there is a requirement for the two (or more) plan positions of the element to be in vertical alignment (i.e. the "x" and "y" co-ordinates of the element cross-sections at two levels are the same), there are also occasions where it is necessary to ensure that an element is positioned at a predetermined angle, so that a plan position at or near the top of the element is at an angle (in either/both the x- or y-direction) with respect to the plan position at or near the bottom of the element. For example, elements which provide foundation support for bridges are normally installed at a predetermined angle. It should therefore be noted that references to alignment or desired alignment should not be interpreted as necessarily being in vertical alignment, but may also be interpreted as encompassing a deliberate mis-alignment in either or both the x or y direction.

A number of techniques have been developed which allow the plan position of the lower level of an element to be brought into the desired alignment with the plan position of the upper level. Known surveying techniques suffer from the disadvantage that the equipment employed (for example, a theodolite) requires skilled technicians. Furthermore, it is necessary to locate the equipment at a significant distance from the element so that the base and head of the element can be viewed.

Another method involves the use of a simple plumb-bob or, alternatively, a laser plumb device. This comprises a laser emitting means fitted at or near the upper level and a target positioned at or near the lower level. The centre-line of the laser and the target are usually located at a fixed offset from the true centre-line of the element. A remote camera or binoculars may be needed to view the laser spot on the target. However, laser plumb bobs require regular calibration to ensure accuracy, a process which is time-consuming and involves the use of a frame of substantial length.

All of the above methods are of limited use when only one end of the element is visible. Moreover, none of the methods above can be applied when the element is hidden, for example, if the element is lowered down a hole filled with fluid.

OBJECT AND SUMMARY OF THE INVENTION

According to one aspect of the present invention there is provided a method of measuring the difference in alignment between a first plan position of an element and a second plan position of an element, the method comprising the use of:

i) at least one rigid or taut connection extending between a first point at the level of the first plan position and a second point at the level of the second plan position, the first and second points being at an identical displacement from the element;

ii) one or more electrolevel gauges provided on the or each rigid or taut connection, so as to measure the inclination of the rigid or taut connection.

An advantage of the present invention is that the plan position of two cross sections of an element can be measured over a greater length than any of the other alignment measurement techniques would allow. Thus by attaching the rigid or taut connection to a bracket positioned at or near the bottom of the element, the plan position of two levels of significant distance apart can be monitored. Furthermore, the present method can be advantageously employed even in situations where the element is partially or totally hidden, or is to be positioned under fluid.

It is important that the points of contact are provided at an identical displacement from the element. Identical displacement is intended to mean that the points of contact have the same displacement in both an x- and y-direction from the element. Preferably, the displacement is measured from the centre-line of the element.

The rigid or taut connection may comprises a wire, a bar or a tube. In one embodiment two electrolevel gauges are provided on a rigid or taut connection so as to measure the inclination of the connection in mutually orthogonal directions. In other embodiments, it may be preferable to employ the use of two rigid or taut connections, each having an electrolevel gauge to measure the tilt in either the X or the Y direction.

A support bracket may be used which extends from the element to a predetermined displacement there from to provide each point of contact for the rigid or taut connection at a convenient distance from the element.

Preferably, the or each electrolevel gauge is connected to an output meter so that the output of the gauge can be monitored and the element verticality adjusted as desired. In cases where the present invention is employed to ensure a predetermined mis-alignment between the upper and lower plan positions, i.e. where the element is to be positioned at an angle, the electrolevel gauge must be calibrated so that it can monitor the inclination of the rigid or taut connection within the required range.

The present invention may be usefully applied to a particular technique often referred to in the trade as 'plunged column piles'. This technique involves a process by which columns are embedded in concrete. It should be noted that although this technique is generally referred to as 'plunged column piles', in actual fact the columns can be either 'plunged' into unset concrete, or they may first be positioned at the correct level and location within the bore, and the concrete subsequently placed into the bore. The end result is the same, namely that the end of a section is embedded in concrete.

Embedded or 'plunged' columns are often used in a technique known in the trade as 'top-down' construction. This type of construction can be used advantageously for a variety of structures below ground, e.g. basements to new buildings, below ground cofferdams, cut & cover tunnels, and the like. During top-down construction techniques it is necessary to position an element, such as a steel section or stanchion, within a pile shaft. Subsequently the element, which is generally positioned vertically above a load bearing pile, may be used to support loads from an above ground structure and to transmit load from ground level to the head of a load bearing pile/concrete column.

Briefly, top-down construction involves the following steps:

i) construction of a perimeter wall which is installed from the prevailing ground level;

ii) installation of load-bearing piles within the curtilage of the perimeter wall. To construct each load bearing pile, a pile shaft of required depth is excavated and may be partially filled with concrete or grout. If the shaft is partially filled at this stage, the concrete of the pile is terminated at a distance below ground that generally corresponds to the level of the (future) basement slab;

iii) insertion and positioning of an element, which may be a steel column, hollow steel section, precast concrete, or any suitable member, into the 'empty' bore of the pile shaft, above the level of the concrete or "pile head". The element is designed to transmit load from ground level to the pile head. Generally the requirement is for the element to be positioned vertically, although other orientation requirements may be required for specific applications;

iv) Once the element column has been positioned within the bore, it is either lowered onto the top of the set concrete in the pile, so that load transmission between the element and the pile is by end-bearing onto the concrete head, or it is plunged some distance into the concrete to become embedded in the pile before it sets.

Several methods have been used in the past for positioning vertical element columns, such as the steel columns or sections, mentioned above.

Traditionally steel casings have been used, extending down to the future low level of concrete cast into the pile. After the bore has been completed, reinforcement and concrete are placed into the pile in the conventional manner. At a later stage, after the concrete has set, an operative descends the casing, in order to clean the concrete surface, cast a reinforced pile cap, and fit a base plate to the head of the pile cap. Following that the element is positioned within the bore, and fixed to the base plate by an operative lowered down inside the casing. Generally, the casing, which is installed to protect the manned descent, is left in place. This traditional method requires a large diameter casing, in order to allow the operative room to work. The cost of the casings is substantial. Additionally, because operatives were lowered into the bore, it was required that special measures be taken to afford complete safety.

More recently, a variety of tools (e.g. EP 0302707) have been used to adjust the position the element by a variety of means: manual adjustment, and electrical and/or hydraulic methods.

In any case, for all of these methods it is necessary to (1) be able to monitor the position of the element at ground level and also (2) have a knowledge of the position of the element at the (low) level of the top of concrete in the pile.

The first requirement can be accommodated by surveying methods. The second requirement—determining the position of the column at a position several meters below ground—presents difficulties. This is because all column sections have inherent tolerances, for example that of 'bow', i.e. the column is not precisely straight. Thus it is not sufficient to use a 'spirit level' to measure the verticality of the column.

A number of means have been used to achieve this. For example, temporary fixings can be placed on the element itself:—e.g. a long 'inverted' plumb bob or a laser plumb and target etc.

However, none of the previously proposed methods are ideal. They involve the steps of first surveying the plumb of the casing, and then fixing offsets directly to the column so as to allow the plump bob or laser system to be attached. Unfortunately, these steps are time-consuming and require that the chosen method of determining the position the column is accurately placed on to the column. Since most temporary casings are not of uniform section, and there must be clearance between the offsets and the bore of the casing, the proper functioning of the alignment measuring system has depended, to a large extent, on the conditions of each bore/casing and the skill of the operative responsible for fixing the offsets to the element. Consequently, the alignment of the element has often been inaccurate, primarily as a result of the deficiencies in the use and application of the known alignment measurement systems, rather than the limitations of the measurement system per se.

According to a second aspect of the present invention, there is provided an apparatus for positioning an element in a borehole, the apparatus comprising an upper positioning means and a lower positioning means for adjusting the plan position of the element at upper and lower levels respectively, the apparatus being provided with a means to measure the difference in alignment between the first plan position of the element and the second plan position of the element.

The apparatus for positioning the element in the bore, preferably comprises a locating frame having at least one pair of adjustable guide frames at either end of the frame. The guide frames preferably comprise a first and a second pair of rollers which are moveable in mutually orthogonal directions across the interior space. The apparatus is placed into a borehole so as to define an interior space through which the element is lowered, and is braced against the inner wall of a temporary casing which lines the pile shaft. The rollers, which bear against the sides of the element, are remotely adjustable and can be operated to locate the element at that level. Once the rollers at the upper level have been adjusted, the rollers at the lower level are also adjusted so as to adjust the plan position of the column at the lower level.

Preferably the means for measuring the difference in alignment between the first plan position of the element and the second plan position of the element extends between the rollers at either end of the apparatus.

An advantage of this aspect of the present invention is that the alignment measuring system forms an integral part of the tool employed to position the element within the bore hole. As a consequence, the alignment measurement system need not be sacrificed after the alignment adjustment has taken place since, in contrast to the element (and thus the measurement system attached thereto), the tool is removed after each operation. Furthermore, the accuracy of positioning methods is significantly improved since the positioning of the alignment measurement device need not be repeated for every operation, but may be carefully and accurately positioned on the apparatus itself.

Preferably, but not essentially, the means to measure the difference in alignment between the first plan position of the element and the second plan position of the element comprises at least one rigid or taut connection which extends between the upper and lower positioning means, and one or more electrolevel gauges provided on the or each rigid or taut connection.

A particular advantage of this embodiment is that the plan position of two cross sections of the element can be measured to a greater depth than any of the other alignment measurement techniques would allow. Thus by attaching the rigid or taut connection to a bracket positioned at or near the bottom of the element, the plan position of two levels of significant distance apart can be monitored. Furthermore, the present method can be advantageously employed even in situations where the element is partially or totally hidden, or is to be positioned under fluid.

BRIEF DESCRIPTION OF THE DRAWINGS

For a better understanding of the present invention, and to show how the same maybe carried into effect, reference will now be made, by way of example, to the accompanying drawings in which:

FIG. 2, 3A and 3B illustrate an apparatus embodying the present invention as applied to an apparatus for positioning an element in a borehole.

FIG. 1 shows an element 1, upper and lower support brackets 2 and 3 respectively, a wire 4, an electrolevel gauge housing 5 connected by a cable 6 to an output meter 7.

Figure 1:
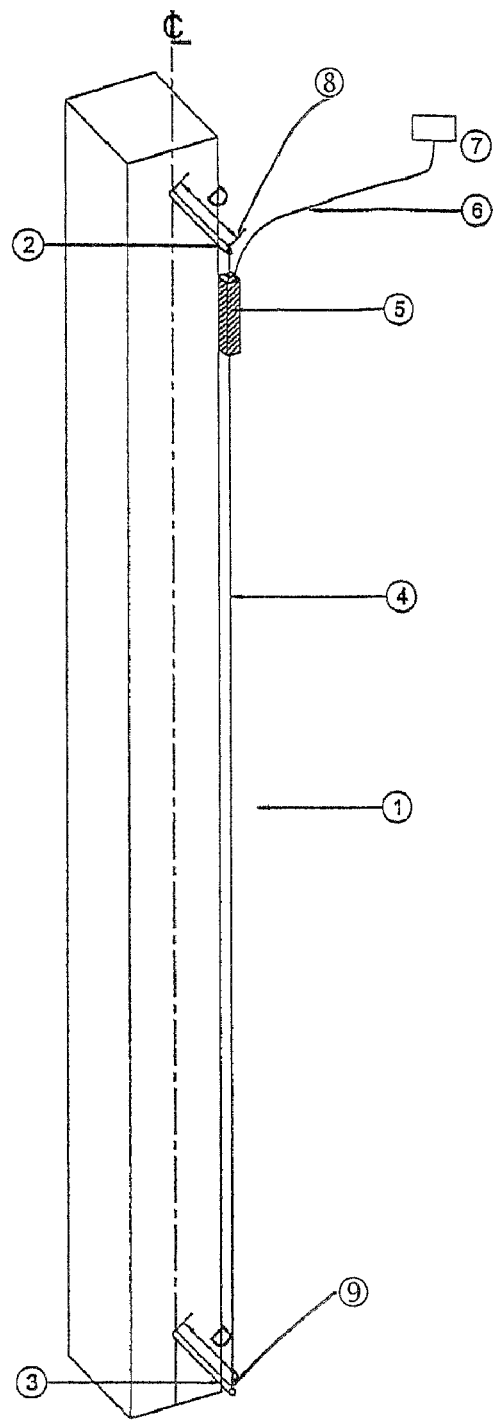
FIG. 1 illustrates a method embodying the present invention.

The element 1 is to be aligned vertically, that is, the plan positions of the element at an upper and lower position are to be brought into vertical alignment. An upper support bracket 2 is fitted on the centre-line C near the top of the element 1. A lower support bracket 3 is fitted on the centre-line C near the bottom of the element 1. A wire 4 is fitted to a connection point 8 of the upper bracket 2 at a distance 'D' from the face of the element 1. The free end of the wire 4 is fitted under tension to a connection point 9 of the lower support bracket 3 at a distance 'D' from the face of the element 1. An electrolevel monitor housing 5 is attached to the taut wire 4. The housing contains two orthogonally positioned electrolevel gauges (not shown). The gauges are connected by an electrical cable 6 to an output meter 7. Because the wire 4 is at an identical displacement relative to the element 1, both at the upper and lower connection points, the inclination of the wire 4 reflects the difference in alignment between the upper and lower plan positions of the element 1. By monitoring the output of the electrolevels it is possible to bring the two positions into vertical alignment.

Therefore by aligning the plan position of an upper and lower cross section of the element, the "bow" in the element becomes irrelevant since the vertical alignment of the two predetermined levels can be assured.

Figure 2:
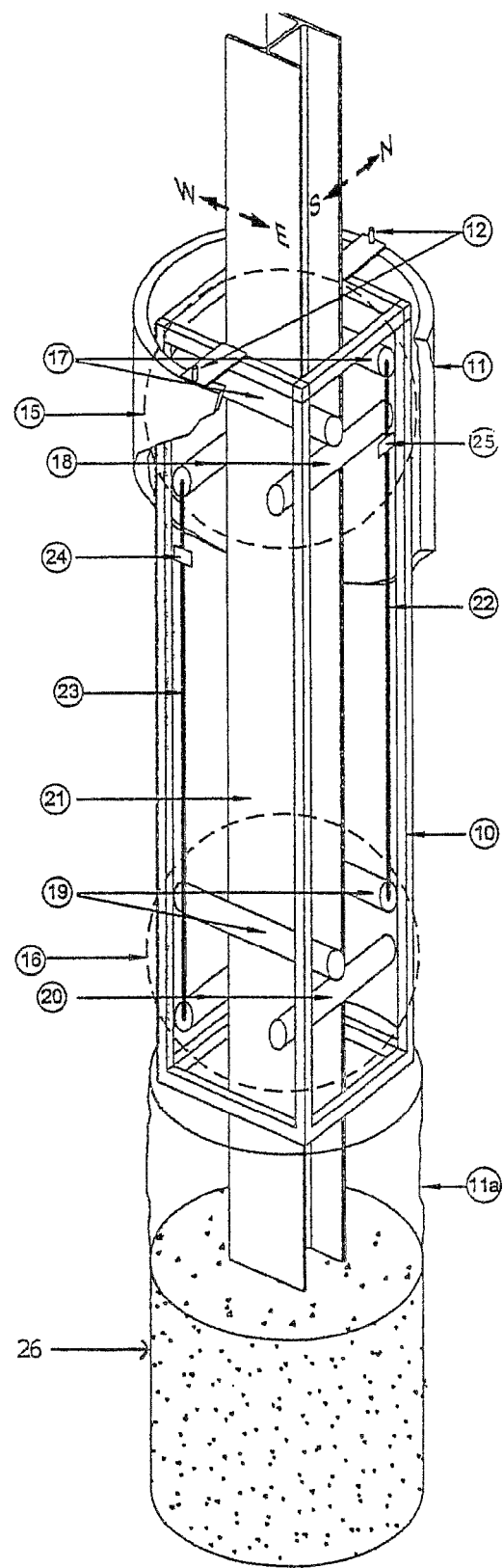

FIG. 2 shows an apparatus 10 which is used to position an element 21 within a borehole. The apparatus comprises an upper positioning means 15 and a lower positioning means 16 (otherwise known as upper and lower steering modules).

Each of the positioning means comprises a rigid frame which defines an interior space through which the column to be positioned may be lowered, and a pair of rollers 17, 18 and 19, 20. The rollers may be moved horizontally in mutually orthogonal directions by means of mechanical, electrical or hydraulic means. Any roller can be moved independently in the horizontal plane. A rigid beam 22 is attached between one end of the roller 17 at the upper steering module 15, and the end of the corresponding roller 19 at the lower steering module 16. A similar beam 23 is attached to the end of roller 18 and roller 20. On each beam 22 and 23 there is attached a sensitive electrolevel device 24 and 25.

The following explanation describes the steps involved in positioning an element within a pile shaft, when the lower part of the bore has been partially filled with concrete. As previously discussed, techniques whereby concrete is placed to a lower level within the bore after the element has been positioned, are equally applicable to the present invention.

In use, the apparatus 10 is lowered into a temporary casing 11 within the borehole and the plan orientation of the apparatus is determined by a pair of dowels 12 temporarily filled to the top of the casing. The upper and power positioning means, 15 and 16 respectively, are secured in place by means of orthogonal locking rams 13 and 14 (shown in FIGS. 3A, 3B)) which are braced against the temporary casing 11.

A column 21, in the form of a steel "H" section, is lowered through the interior space defined by the upper and power positioning means 15 and 16 respectively to a level just above the head of the concrete of the load bearing pile 26. The rollers in the upper and lower positioning means, which are conveniently moved as far apart as possible before use, are moved horizontally so as to bear on the four outer edges of the column 21. They may then be used to adjust the plan position of the column 21 at the upper and lower level as necessary.

The plan position at the upper level of the column can be determined by means of conventional surveying techniques. The electrolevel devices 24 and 25 give a voltage output that varies with the inclination of the beams 22 and 23. Therefore, by means of the rollers, the position of the element can be adjusted so as to give a zero reading when the beams 22 and 23 are vertical. Given that the beams are attached to the centre of the rollers, and the rollers bear directly on to the column 21, then the centre of the column at the lower steering module is precisely below (i.e. vertically beneath) the centre of the column at the upper steering module when the beams are confirmed to be vertical. Note that if there is a 'bow' in the column, it is irrelevant—the mechanism described confirms that the plan position of the column at the two levels is in vertical alignment.

The above relates to column sections; the system will cater for any other section without departing from the scope of the present invention.

The invention claimed is:

1. An apparatus for positioning an element in a borehole, the apparatus defining an interior space into which, in use, the element is lowered, comprising:

an upper positioning means and a lower positioning means for adjusting the plan position of the element within the interior space at upper and lower levels respectively, the apparatus being provided with a means to measure the difference in alignment between the first plan position of the element and the second plan position of the element, and wherein the means to measure the difference in alignment between the first plan position of the element and the second plan position of the element extends and is fixed, between the upper and lower positioning means.

2. An apparatus for positioning an element in a borehole, the apparatus defining an interior space into which, in use, the element is lowered and comprising an upper positioning means and a lower positioning means for adjusting the plan position of the element within the interior space at upper and lower levels respectively, the apparatus being provided with a means to measure the difference in alignment between the first plan position of the element and the second plan position of the element, wherein the means to measure the difference in alignment between the first plan position of the element and the second plan position of the element, comprises at least one rigid or taut connection and one or more electrolevel gauges provided on the each rigid or taut connection.

3. An apparatus as claimed in claim 2, wherein the rigid or taut connection comprises a wire.

4. An apparatus as claimed in claim 2, wherein the rigid or taut connection comprises a bar or tube.

5. An apparatus as claimed in claim 2, wherein two electrolevel gauges are provided which are arranged so as to measure the inclination of the rigid or taut connection in mutually orthogonal directions.

6. An apparatus as claimed in claim 5, wherein both of the electrolevel gauges are provided on a single rigid or taut connection.

7. An apparatus as claimed in claim 2, wherein two rigid or taut connections are provided.

8. An apparatus as claimed in claim 1, wherein the upper and lower positioning means each comprise a guide means for adjusting the plan position of an element within the interior space.

9. An apparatus as claimed in claim 8, wherein the guide means comprises a first and a second pair of rollers which are moveable in mutually orthogonal directions across the interior space.

10. An apparatus as claimed in claim 1, wherein the means to measure the difference in alignment between the first plan position of the element and the second plan position of the element, comprises at least one rigid or taut connection and one or more electrolevel gauges provided on the or each rigid or taut connection.

11. An apparatus as claimed in claim 10, wherein the rigid or taut connection comprises a bar or tube.

12. A method of positioning an element in a borehole, the method comprising the steps of:

i) placing into the borehole an apparatus comprising an upper positioning means and a lower positioning means for adjusting the plan position of the element within the interior space at upper and lower levels respectively, the apparatus being provided with a means to measure the difference in alignment between the first plan position of the element and the second plan position of the element;

ii) lowering the element into an interior space defined by the apparatus to a required depth within the borehole; and iii) measuring the difference in alignment between the first plan position of the element and the second plan position of the element by means of the or each electrolevel gauge; and iv) adjusting the upper and lower positioning means to achieve the desired alignment between the first and second plan positions of the element, wherein the means to measure the difference in alignment between the first plan position and the second plan position comprises the use of:

i) at least one rigid or taut connection extending and fixed between a first point at the level of the first plan to the level of the first plan position and a second point at the level of the second plan position, the first and second points being at an identical displacement from the element;

ii) one or more electrolevel gauges provided on the or each rigid or taut connection, so as to measure the inclination of the rigid or taut connection.

13. A method as claimed in claim 12, wherein the rigid or taut connection comprises a wire.

14. A method as claimed in claim 12, wherein the rigid or taut connection comprised a bar or tube.

15. A method as claimed in claim 12, wherein two electrolevel gauges are provided which are arranged so as to measure the inclination of the rigid or taut connection in mutually orthogonal directions.

16. A method as claimed in claim 15, wherein both of the electrolevel gauges are provided on a single rigid or taut connection.

17. A method as claimed in claim 12, wherein two rigid or taut connections are provided.

18. A method as claimed in claim 12, wherein the or each electrolevel gauge is connected to an output meter.

* * * * *